United States Patent
Visser (10) Patent No.: US 8,887,438 B2
(45) Date of Patent: Nov. 18, 2014

(54) SYSTEM AND METHOD FOR TRANSFERRING AND SINGULARIZING PLANT MATERIAL IN A CONTAINER, CONTAINER FOR PLANT MATERIAL, USE OF A CONTAINER FOR PLANT MATERIAL

(75) Inventor: Anthony Visser, 'S-Gravendeel (NL)

(73) Assignee: Visser 'S-Gravendeel Holding B.V, 'S-Gravendeel (NL)

( * ) Notice: Subject to any disclaimer, the term of this patent is extended or adjusted under 35 U.S.C. 154(b) by 309 days.

(21) Appl. No.: 13/165,547

(22) Filed: Jun. 21, 2011

(65) Prior Publication Data

US 2012/0005955 A1 Jan. 12, 2012

(30) Foreign Application Priority Data

Jun. 23, 2010 (NL) .................................... 2004951

(51) Int. Cl.
| | | |
|---|---|---|
| *A01C 11/00* | (2006.01) | |
| *A01G 9/02* | (2006.01) | |
| *A01G 9/08* | (2006.01) | |
| *A01G 9/10* | (2006.01) | |

(52) U.S. Cl.
CPC ................ *A01G 9/088* (2013.01); *A01G 9/108* (2013.01)
USPC ................... 47/58.1 R; 47/66.7; 47/74; 47/73

(58) Field of Classification Search
CPC ........ A01G 9/088; A01G 9/083; A01G 9/108
USPC .................. 47/66.7, 73, 74, 58.1 R
See application file for complete search history.

(56) References Cited

U.S. PATENT DOCUMENTS

| | | | | |
|---|---|---|---|---|
| 3,187,463 | A | | 6/1965 | McCollough et al. ............. 47/74 |
| 3,798,837 | A | | 3/1974 | Oehmke et al. .................... 47/77 |
| 4,231,186 | A | | 11/1980 | Ruuska .............................. 47/74 |
| 4,341,333 | A | * | 7/1982 | Boa et al. ......................... 225/96 |
| 5,048,434 | A | * | 9/1991 | Forster et al. .................. 111/105 |
| 5,068,999 | A | * | 12/1991 | Visser ............................... 47/73 |
| 5,382,268 | A | * | 1/1995 | Brown et al. .............. 47/1.01 R |
| 5,557,881 | A | * | 9/1996 | Bouldin et al. ............ 47/1.01 R |
| 6,546,670 | B2 | * | 4/2003 | Bautner ............................ 47/77 |
| 2004/0079263 | A1 | | 4/2004 | Tagawa et al. ................ 111/101 |
| 2010/0180500 | A1 | * | 7/2010 | Visser et al. ...................... 47/86 |

FOREIGN PATENT DOCUMENTS

| | | |
|---|---|---|
| EP | 0 426 549 | 5/1991 |
| FR | 2 357 160 | 2/1978 |
| GB | 2 076 769 | 12/1981 |

OTHER PUBLICATIONS

PCT International Search Report and Written Opinion issued in International application No. PCT/NL2011/050454, dated Oct. 6, 2011.

* cited by examiner

*Primary Examiner* — Monica Williams
*Assistant Examiner* — Joshua Huson
(74) *Attorney, Agent, or Firm* — Parker Highlander PLLC (57) ABSTRACT

The invention relates to a container with cells for plant material, and/or systems and methods involving the transfer of cells containing plant material to larger cells (e.g., without removing the plant material from the cells being transferred to larger cells). The container can be used to transport plant material. The container has cells formed from biodegradable material. The cell itself can hereby be gripped by a transfer unit during a transfer method and this cell can be placed in a larger cell. In addition, the cells of the container can be separated from the rest of the container before the cell is transferred.

10 Claims, 4 Drawing Sheets

SYSTEM AND METHOD FOR TRANSFERRING AND SINGULARIZING PLANT MATERIAL IN A CONTAINER, CONTAINER FOR PLANT MATERIAL, USE OF A CONTAINER FOR PLANT MATERIAL

CROSS-REFERENCE TO RELATED APPLICATIONS

This application claims benefit of priority to Dutch Patent Application Serial No. NL-2004951, filed Jun. 23, 2010, the entire contents of which are hereby incorporated by reference.

BACKGROUND

1. Field of the Invention

The invention relates to a method for transferring plant material received in a container. The invention also relates to a method for singularizing plant material received in a container. In addition, the invention relates to a system for transferring containers for plant material, in particular transferring such containers into larger containers. In addition, the invention also relates to a system for singularizing containers for plant material, in particular a container comprising a row of a number of cells defining plant positions.

The invention further relates to a container for plant material with a plant position-defining cell which can be used in the transfer of plant material into larger cells. The invention further relates to a container for plant material with a row of plant position-defining cells. The invention also relates to the use of such containers for plant material (e.g., use of the present containers in embodiments of the present methods).

2. Background Information

A container for plant material is generally known. An example of a known container is a tray for plants. Such trays are for instance manufactured with an injection-moulding process or by deep-drawing, or have an otherwise integral form. Normally defined in a container are cells which are usually formed as recesses or cavities relative to the upper surface of such a container.

Substrate in which plant material is positioned can be arranged in such a cell. Such plant material is for instance a cutting, a seedling, a plant and so on. In an embodiment the cell is also the container.

Such known containers, in particular containers with a plurality of cells, have drawbacks. It is thus difficult to distinguish the individual cells when a leaf of plant material in one cell extends over the substrate and/or the plant material in a neighbouring cell. This is particularly inconvenient when the plant material placed in the container has to be transplanted to another container, such as a flower pot or open ground and so on. This is particularly inconvenient when an automated process or automated installation is desirable for automated processing of the plant material in such a container. The individual cells cannot be distinguished, or only with difficulty, and when the substrate and/or the plant material in a specific cell must be gripped with cutting or gripping means, damage can be caused to leaf material of adjacent plant material, even if it is still possible to orient the gripping or cutting means in sufficiently precise manner toward the cell having therein the plant material selected for transplantation.

Is also known to transport cuttings by accommodating at least a part of a root of the cutting in a plastic bag. The bag can also comprise a substrate part. There are time limitations for the transport of cuttings. A cutting in a plastic bag is preferably transplanted within a day to another container so that further growth is not impeded by the transport.

SUMMARY

It is an object of the invention to improve at least one of the aspects associated with plant material in containers.

The object is at least partially achieved according to an aspect of the invention wherein a method for transferring plant material is provided. The method preferably comprises of providing plant material in a cell. The method also comprises of transferring this plant material.

The cell preferably defines a plant position. The cell preferably has at least a wall and a base. Plant material can hereby be placed in the cell, for instance in combination with a substrate. The cell is adapted to hold the plant material and the optional substrate at a defined position.

According to an aspect the wall and/or base are preferably formed from biodegradable material. The method preferably also comprises of transferring the cell with wall and base to a larger cell which defines a plant position and which is formed by at least one wall. The cell can also have a base. This can for instance be a flower pot, but can also be a cell of a tray. The larger cell will allow further growth of the plant material.

Because the cell with plant material is biodegradable, the cell can be transferred together with plant material to a larger cell. The biodegradable cell can be degraded during the further growth. Because plant material can be transferred together with the cell, less damage will be caused to the plant material for transfer.

This method moreover allows efficient transport of plant material in containers with such cells. During transport the plant material can continue to grow undisturbed in the cell and this further growth is not disrupted, or hardly so, during transfer after transport.

In an embodiment the cell for transfer is filled with both plant material and substrate. The method according to the invention then allows transfer of the cell including substrate. The substrate need not be detached from the plant material.

In an embodiment of the method the larger cell is filled with substrate before the transfer. The cell for transfer can hereby be placed into the substrate present in the larger cell and the process of biological decomposition of the cell is continued.

According to an embodiment a container for plant material is provided comprising a row (e.g., only a single row) with a number of cells (e.g., at least two, three or more, eight or more, etc.). Part of the method is then also that the cells are singularized, wherein a connection between the cells is broken. Because a container with a plurality of cells is provided, the plant material can be transported in bulk in the container and be transferred into other larger cells at the target location.

This breaking preferably takes place prior to the actual transfer. The row of cells is supplied and a cell at an outer end of the row is detached from the remaining cells with plant material. This separation can be repeated each time for repeated transfer.

In an embodiment the container is an insert which can be received in a tray. The processing of such a container with a row of cells is simpler than that of a tray with a matrix of cells. The container can have one or more of the following measures for further improvement of the transport/processing properties of the container.

Breaking of the connection between the cells can be performed by machining. This does however result in soiling. In an embodiment the breaking according to the method comprises of non-machining breaking of the connection, for instance by means of a laser. A part of the material can here evaporate.

In an embodiment the transfer comprises of gripping a single cell with plant material, placing the single cell with plant material in the larger cell and releasing the cell with plant material. Because the cell can be gripped instead of the fragile plant material or substrate, a method is obtained which is made mechanically simpler and which can therefore be performed with greater certainty and stability.

In an embodiment the cell for transfer is gripped during separation of this cell from the rest of the container. The position of the cell can be easily defined before separation and thereby gripped mechanically. In an embodiment the transfer unit grips the cell for separating before separation takes place.

In an embodiment the larger cell is provided by supplying a container or tray comprising a number of larger cells. The larger cells can hereby be transported in bulk.

According to an aspect of the invention, an improved container for plant material is also provided. In an embodiment the container comprises a cell, wherein the cell defines a plant position and is formed by at least one wall and a base for filling with plant material during use, wherein this base and/or wall comprises biodegradable material. Because the cell comprises a biodegradable material, the cell itself can be transferred to a larger, other cell and the plant material and/or substrate need not be removed from the cell during this transfer. This results in less damage to the plant material.

A biodegradable material is a material which decomposes within a phase of the lifespan of plant material. A phase is for instance understood to mean a determined size. More rapidly biodegradable material can be used for smaller plant material than for larger plant material.

In an embodiment a container is provided which comprises a row of at least two of such formed cells. The container can be an insert of a tray.

The container with a row of cells preferably has a connection which mutually connects two cells in one row, wherein the connection is adapted to be broken. A row of cells is hereby obtained which can be singularized in one process.

It is for instance advantageous for two cells separated by the connection to each have a wall which largely encloses the cell and which defines the plant position such that breaking of the connection leaves the individual cell intact. Plant material present in the cell and possibly present substrate hereby remains in place. Breaking of the connection preserves the cell, and thereby the plant position-defining characteristic. An individual cell is obtained by breaking the connection. The individual cell of biodegradable material can for instance be transferred to a larger cell. The container according to the invention is then highly suitable as container for plant material during transport.

According to a further aspect of the invention a system for transferring plant material is improved. Such a system can comprise a first feed for cells with plant material and a second feed for larger cells for plant material. A transfer unit is provided for transfer purposes. According to an embodiment the transfer unit is adapted to grip the cell and place the cell in the larger cell. The whole cell with plant material is hereby transferred. Gripping of the cell instead of for instance gripping the plant material or a part of the substrate is hereby realized. Gripping of the cell, in particular a wall or base of the cell, is a considerable simplification of the transfer unit.

In an embodiment the first feed is adapted to feed a container for plant material comprising a row of a number of cells, i.e. a number of mutually connected cells. A suitable embodiment is a guide such as a conveyor belt. This allows a row of such cells to be fed to the transfer unit.

In an embodiment the system further comprises a separator for breaking a connection between two cells in the row. The separator is adapted to break a connection between two cells. The separator is preferably connected to the frame to which the first feed is also connected. The position of the separator and the feed can hereby be determined.

The system can for instance have a stop against which the row with connected cells can be supplied, wherein the separator is arranged at a fixed distance from this stop corresponding to the distance between the leading end of the row of cells and the connection between two successive cells. The connection can be broken, for instance in the embodiment of a saw, by then moving the separator for instance at a right angle to the longitudinal direction of the row of cells. In another embodiment the separator comprises for instance a sensor adapted to detect the location of the connection between two cells. The separator can be controlled subject to the detected location in order to then break the connection. Other embodiments are also possible within the scope of the invention.

In an embodiment the separator is a non-machining separator such as a laser. Soiling by chippings is hereby prevented.

In an embodiment the transfer unit comprises a gripping means, preferably a number of movable pins, between which the cell can be gripped. In an embodiment the pins are movable in a longitudinal direction. In an embodiment the pins are also displaceable in a direction toward each other. In an embodiment at least one pin is pivotable relative to the other pin (e.g., both pins may be pivotable relative to one another). Gripping of the cell between the pins is possible with this latter movement.

The transfer unit preferably also comprises a rail, preferably two guides, which enable a movement in a plane of the gripping means. The gripped cell can hereby be carried to a position close to the second feed and there placed in the desired cell.

In an embodiment the transfer means comprises a number of gripping means for simultaneous gripping of a number of cells (multiple gripping means each configured to grip a different cell). The speed of transfer can hereby be increased. In an embodiment the distance between the gripping means is variable. The intermediate distance between the gripped cells of the first feed can hereby differ from the intermediate distance between the larger cells on the second feed.

According to a further aspect of the invention a container for plant material is also provided, which container comprises at least a row of at least two cells, wherein the cell defines a plant position and is formed by at least one wall largely enclosing the plant position and for instance a base for filling with plant material during use, wherein a connection connects the cells of one row to each other, wherein the connection is adapted to be broken. A container is hereby provided which comprises a number of cells and which is therefore suitable for instance for transport, while the cells of the container can on the other hand be singularized or at least divided into smaller units of a determined number of cells. This is particularly advantageous when treatment of plant material in a single cell is desired following transport.

It is advantageous for the connection to comprise a scoring and/or perforation for the purpose of breaking the connection between two cells close to the scoring and/or perforation. The connection is hereby broken with less soiling by chippings. The scoring can also be an orienting element on which an external separator such as a saw can easily engage. The scoring then also functions as guide for the separator.

It is also advantageous to adapt the connection with a breaking edge for the purpose of breaking the connection. For example, the connection can comprise a weakened breaking line (e.g., along which the connection is relatively thinner) along which the connection can be broken with less force or effort than if the full thickness of the connection were maintained along the breaking line. The connection is hereby easier to break.

In an embodiment the container has a row of at least three cells lying substantially in a line. A container is hereby obtained which can also transport three items of plant material at a time.

In an embodiment a first cell of the container comprises a first wall largely enclosing the cell and an adjacent second cell has a second wall largely enclosing the cell, wherein the first and second walls are formed separately (container may comprise separate walls enclosing separate cells). An intact cell defining the plant position is hereby preserved after breaking of the connection between the cells.

In an embodiment the wall and/or the base of a plant position-defining cell is formed from a biodegradable material. Is hereby possible to process the cell together with plant material, for instance transfer it into another cell or into another, for instance larger container. The cell will dissolve. The plant material need not be detached from the cell, which considerably reduces the chance of damage to the plant material. In an embodiment at least one of the cells comprises an open wall on at least one side (e.g., comprises a wall with an opening through the wall). For example, in some embodiments, the opening spans greater than 20% of the area of the side (e.g., 30%, 40%, 50%, or more of the area of the side). The content of the cell is hereby easily accessible from outside and this content can be gripped. Such an open side can be oriented toward the end surface in the longitudinal direction of a row of cells, but an open wall of a cell is preferably arranged in an orientation lying transversely of a longitudinal direction defined by the succession of the at least two cells. This is particularly advantageous in embodiments with three or more cells in each series from which the insert is formed.

In an embodiment the side with the open wall is oriented transversely of a longitudinal direction defined by the succession of the at least two cells.

In an embodiment the row of cells with connections therebetween is formed integrally. For example, in some embodiments, the connection between directly connected cells is integral to the cells (e.g., is of unitary construction with the cells). Before it is broken the connection is hereby sufficiently strong to form for instance a row of ten or more cells, which can be gripped at an end.

According to a further aspect of the invention the use (or method including use) of a container is provided for the purpose of singularizing plant material. The use relates to the use of a specific container for plant material, i.e. a container comprising at least a row of at least two cells, wherein the cell defines a plant position and wherein this cell is formed by at least one wall and for instance a base. The cell is filled with plant material during use. Cells in one row are mutually connected (connected to one another) by a connection. For example, in a container with three or more cells sequentially connected together in a linear arrangement, adjacent cells are directly connected, and a non-adjacent cells are indirectly connected. In the use according to the invention the connection is broken. Singularized cells or a unit of a number of cells are hereby obtained. The separated cells can subsequently be further processed, for instance placed integrally in a larger cell.

In an embodiment an external separator is used to break the connection.

In an embodiment of the use the container has one or more of the measures stated above or below which further facilitate breaking of the connection.

According to an aspect of the container, the use of a separator is provided for the purpose of breaking a connection between cells of a container for plant material, wherein a container for plant material comprises at least a row of at least two cells, wherein the cell defines a plant position and wherein this cell is formed by at least one wall and for instance a base for filling with plant material during use, wherein a connection connects the cells of one row to each other.

BRIEF DESCRIPTION OF THE DRAWINGS

Following the foregoing overall indication of the specific characteristics of certain embodiments of the present methods, systems and components, containers, and trays according to the present invention, specific embodiments will be described hereinbelow with reference to the accompanying drawings, which are in no way intended or should be interpreted as being limitative for the scope of protection defined in the claims, and wherein the same reference numerals are applied for the same or similar parts, components and aspects, and in which:

The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

Figure 1:
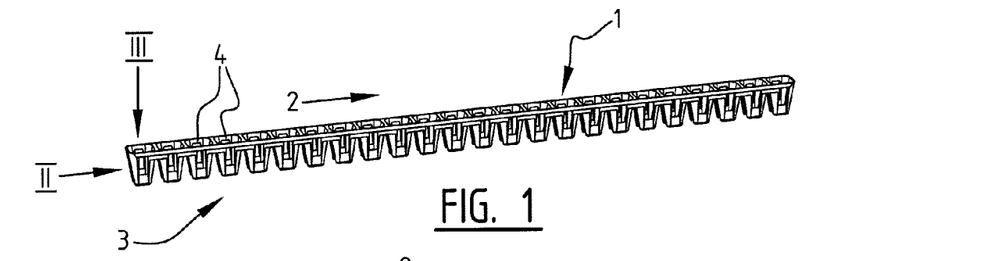
FIG. 1 is a perspective view of a first embodiment of a container for plant material.
Figure 4:
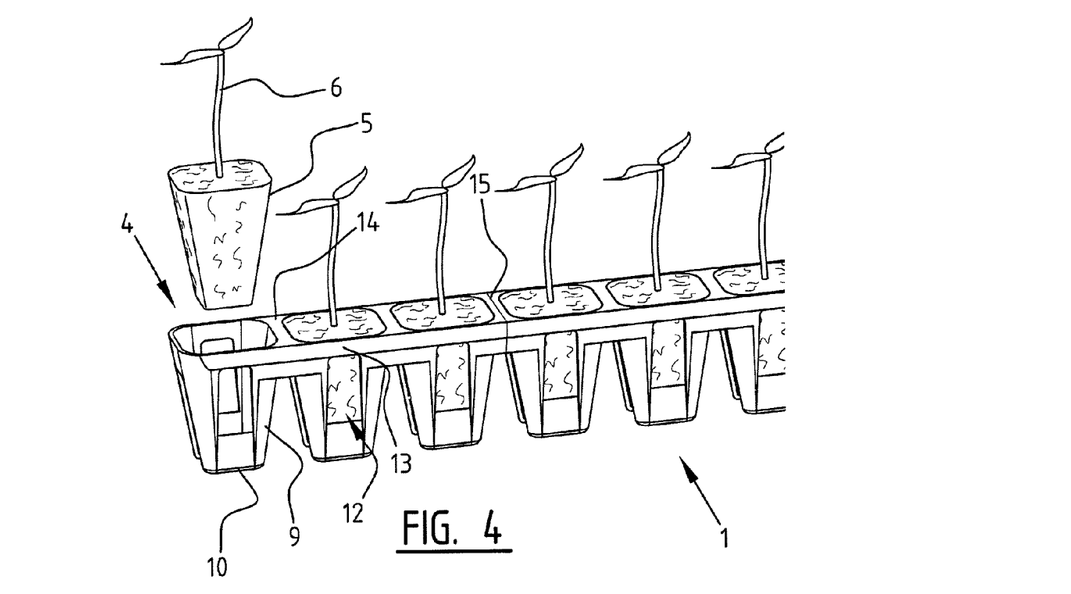
FIG. 4 is a detailed perspective view of a container for plant material filled with plant material and substrate.

FIG. 1 is a perspective view of a container 1 according to the present invention. Container 1 has a row 3 of cells 4 which can be filled with plant material. As shown in FIG. 4, cells 4 are filled with substrate 5 and plant material 6 grows in substrate 5.

In FIG. 1 a container 1 comprises in longitudinal direction 2 a single series of cells 4. In the shown embodiment the number of cells is more than eight, in particular more than fifteen.

Figure 2:
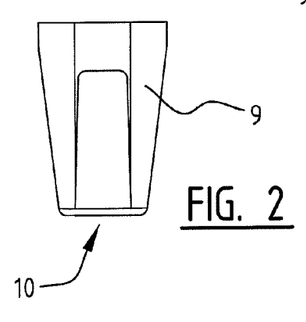
FIG. 2 is a side view according to II in FIG. 1.
Figure 3:
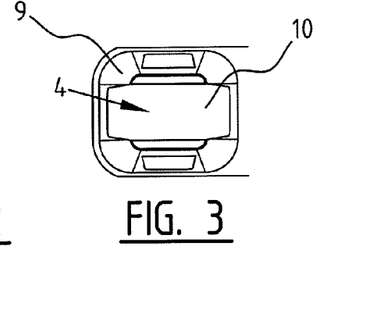
FIG. 3 is a top view according to III in FIG. 1.

FIG. 2 is a side view of container 1 as according to II. Container 1 has a cell comprising a wall 9 and a base 10. Cell 4 is largely enclosed by wall 9. Substrate 6 and plant material 5 can hereby be received in the cell and positioned as shown in FIG. 4. In an embodiment a clearly defined base 10 is omitted and cell 4 comprises only side walls 9.

The wall 9 around the cell can particularly have openings 12 on the side transversely of longitudinal direction 2.

A connecting part 13 can be part of the cell, wherein this connecting part 13 forms a part of the wall of cell 4.

In the shown embodiment two cells are mutually connected in longitudinal direction 2 via a connection 14. Connection 14 is a connection between two spaced-apart cells 4 and wall parts 10 of these cells 4, whereby it is possible to break the connection while the cell wall of the separated cells remains intact.

In an embodiment connection 14 can be embodied with a weakened portion such as a breaking edge or line which facilitates breaking of the connection. A schematically indicated breaking line 15 between two cells is shown in FIG. 4. Connection 14 can be embodied in each case with an example of such a weakening.

It is advantageous to surround cell 4 with the least possible material of container 1. In an embodiment cell 4 has a connecting part 13 as shown in FIG. 4. In another embodiment such a connecting part is absent. The connection from the one side of cell 4 in longitudinal direction 2 to the other side of the cell wall can run wholly via base 9.

As shown in the embodiments according to FIG. 1-4, the cell preferably tapers downward from the top, whereby a substrate with the form as shown in FIG. 4 can be received in the cell.

Using gripping or cutting means, substrate 5 can be placed in each of the cells 4 in container 1 as shown in FIG. 4 without obstruction by leaf material of plant material 6 extending over cells. Owing to the downward converging form of each of the cells 4 the cutting or gripping device could also be oriented straight upward.

Although plant material 6 is shown in FIG. 4 aligned in each case in the centre of cell 4, this is not essential.

Figure 5:
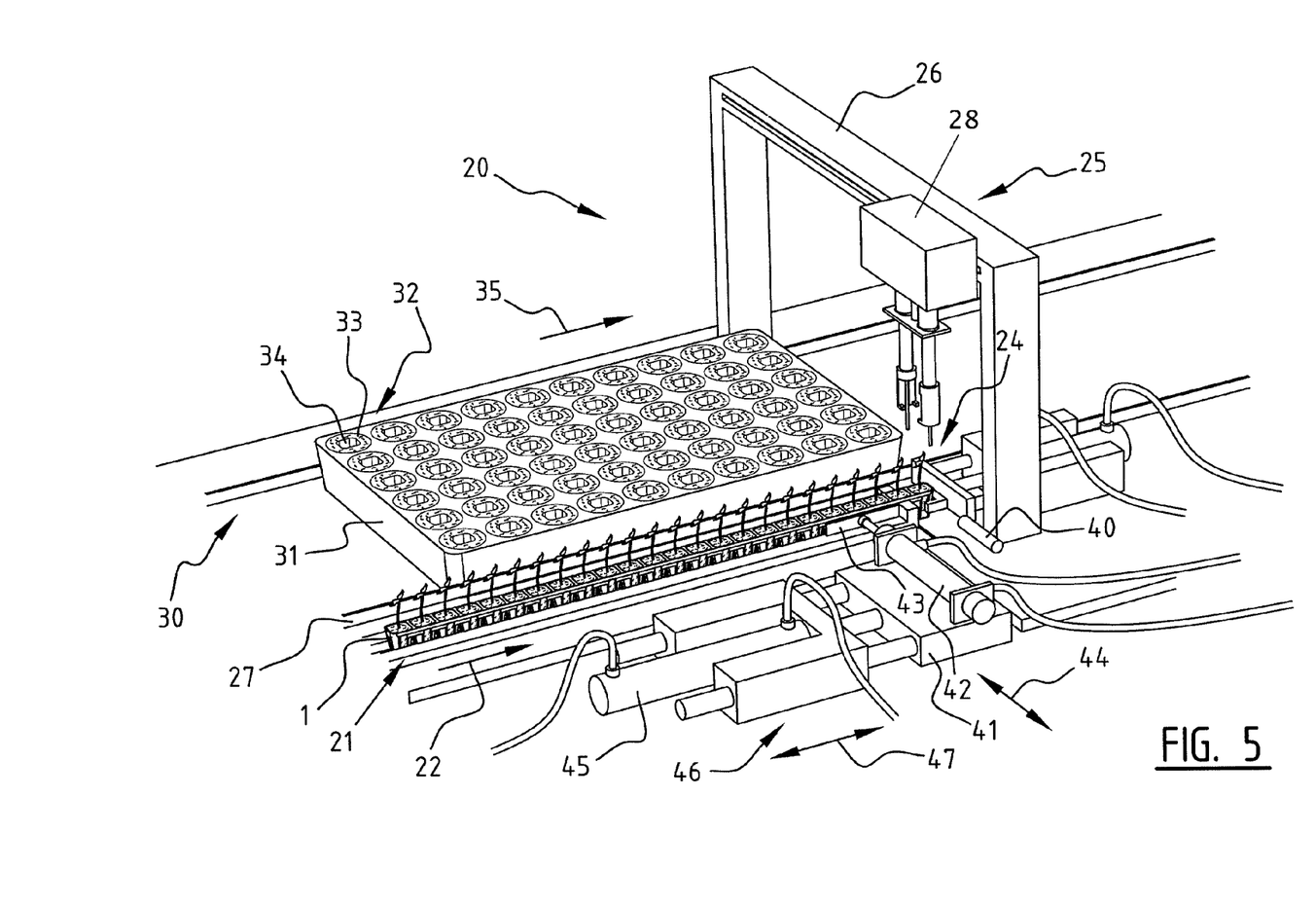
FIG. 5 is a perspective view of a first embodiment of a transfer system according to the invention.

FIG. 5 is a perspective view of a transfer system 20. The transfer system comprises a feed 21. Feed 21 comprises a guide and a feed belt or other transport means. Feed 21 is adapted to support and supply containers 1. Feed 21 can for instance support the base 9 of containers 1. In another embodiment a side of container 1 is supported.

Feed 21 has a drive 45 adapted to displace the row 3 of cells 4 in the direction 22. Drive 45 (and/or other drives described in this disclosure) can comprise any suitable drive mechanism and/or coupling structures capable of functioning as described (e.g., a hydraulic cylinder or other hydraulic drive; an electric motor or actuator, or other electric drive; transmissions, chains, belts, links, joints, rails; and/or the like).

Transfer system 20 further comprises a drive 42 of an arm 43 adapted to grip container 1 from a lateral direction. The drive allows arm 43 to move reciprocally in the direction of arrow 44. Arm 43 can thus be brought into contact with container 1. Arm 43 and drive 42 form part of sub-frame 41 which is connected to drive 45. In the embodiment shown, drive 45 is connected fixedly (in fixed relation) to frame part 46. Other embodiments are of course possible.

When arm 43 is in engagement or contact with container 1, drive 45 can be used to displace container 1 in longitudinal direction 2 in the direction of stop 24. The container can then be temporarily held in place in the displaced position. In a following step the engagement can be released by moving arm 43 away from the container as according to arrow 44. In a subsequent step drive 45 can move sub-frame 41 as according to arrow 47. In the embodiment shown, the direction of arrow 47 is substantially perpendicular to the direction of arrow 44. In a further subsequent step arm 43 can once again be placed into engagement with a side of the container. Other embodiments are of course possible.

It hereby becomes possible to displace the container over feed 21 through the distance of the width of one cell at a time in the direction of stop 24.

Figure 6:
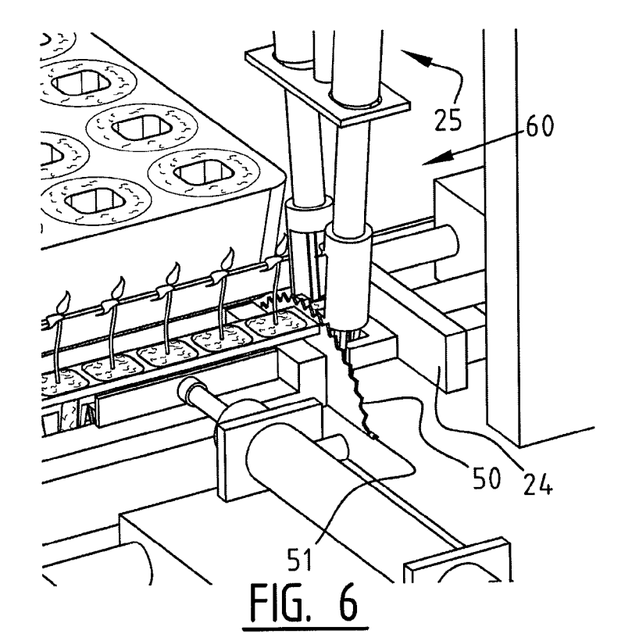
FIG. 6 is a detailed perspective view of a second embodiment of a transfer system according to the invention.

Feed 21 guides container 1 in the direction of stop 24, shown in detail in FIG. 6. Stop 24 is placed such that a transfer unit 25 can engage the outer end of container 1.

Feed 21, stop 24 and transfer unit 25 are connected to the frame of the machine, for instance frame 26, 27. Transfer system 20 also comprises a drive configured to move transfer unit 25 laterally relative to frame 26 in the directions indicated by bi-directional arrow 44. In the embodiment shown, transfer unit 25 includes a housing 28 which can include a drive for displacing transfer unit 25 relative to frame 26 and/or for actuating gripping means 60 as described in further detail below.

A further second feed 30 is adapted in this embodiment to supply trays 31 which comprise cells 32 in a two-dimensional pattern. Cells 32 are larger than cells 4 of container 1. In the shown embodiment cells 32 are already filled with substrate 33. Substrate 33 is preferably provided with a cavity 34. Feed 30 comprises a guide and a drive for feeding tray 31 in direction 35.

In another embodiment larger cells 32 can be supplied which are in each case separate cells, such as cells in a plant pot. Used in another embodiment are larger cells of a container similar to container 1.

Container 1 can be used particularly according to the invention to transport plant material and optional substrate. The plant material can continue to grow during transport in container 1. A transfer system 20 can be applied at the final destination.

Container 1 is particularly suitable according to the invention for transport in that at least wall 9 and/or base 10 of cell 4 are formed from a biodegradable material. The container preferably contains only biodegradable material. Such a material allows the cell of base and wall to be placed together with the plant material and optional substrate into a larger cell 32 after transport. The biodegradable material of the cell of container 1 will decompose in the environment of the larger cell and eventually dissolve.

The biodegradable material used is preferably adapted to decompose within two months, preferably within one month. In an embodiment the biodegradable material retains its shape characteristics for at least one day, preferably for at least three days, after the material has come into contact with plant material or substrate.

Use is preferably made of a method for forming container 1 with row 2 of cells 4 by means of an injection moulding technique. This allows manufacture at low cost.

The placing of substrate 5 and plant material 6 in cell 4 as according to FIG. 4 represents the moment at which the process of decomposition of the material used begins.

Transfer system 20 comprises a separator, in the embodiment according to FIG. 5 a laser 40. The laser is adapted to break the connection between cells of container 1.

FIG. 6 shows a detail of a second embodiment of transfer system 20. Shown instead of laser 40 is a separator in the form of a saw 50. Formed in a base plate is a slot 51 through which saw 50 can be placed. Slot 51 is aligned with stop 24 such that exactly one cell and a part of connection 14 are located between slot 51 and stop 24. Saw 50 will be driven and break the connection 14 between the end cell and the following cell, whereby a singularized cell with plant material is obtained.

In yet another embodiment a shears or other two-sided cutting means or device is used to separate the cells. In yet another embodiment a single-sided cutting means or device can be used, such as, for example, a blade or knife edge.

FIG. 6 also shows how gripping means or mechanism 60 of transfer unit 25 grip cell 4, in particular wall 9 or base 10. According to the invention the gripping means can grip cell 4 instead of the substrate and/or the plant material, since according to the invention the plant material and possible substrate are transferred together with the singularized cell into the larger cells. This is possible because of the use of biodegradable material. In some embodiments, gripping means 60 may contact both of cell 4 and substrate 5, but will generally not damage substrate 5 or plant material 6 (e.g., because substrate 5 remains in and protected by cell 4).

In an embodiment the gripping means 60 comprise hooks for gripping parts of wall 10 of cell 4. For example, clamps 64 of gripping means 60 can each be configured to have a hook or protrusion portion extending inward toward the opposing clamp such then when opposing clamps 64 are pivoted toward each other (as in FIG. 8A), the hook or protrusion portion extends at least partially into the open sidewall 12 of a respective cell 4.

Figure 7:
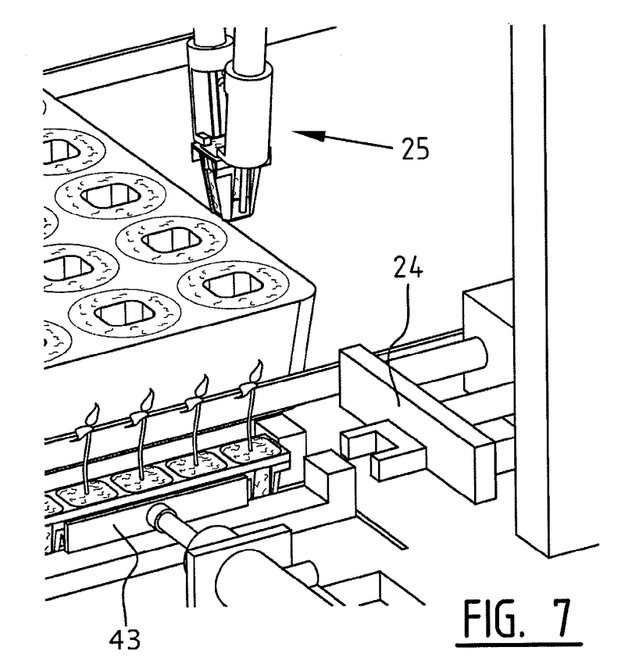
FIG. 7 is a detailed perspective view of an embodiment of a transfer system according to the invention.

FIG. 7 shows a particular step according to the transfer method. Transfer unit 25 is displaced using the drive while cell 4 is being gripped. The transfer is in progress. Arm 43 is in engagement with the remainder of container 1 and is moved back a short distance (e.g., less than the length of a single cell 4) using drive 45. Gripping and lifting of the singularized cell is hereby easier (e.g., by preventing mechanical interference between cut portions of connection 14 remaining with each of two adjacent cells 4).

Transfer methods are generally known and can be performed in different ways. It is possible to align transfer unit 25 in each case with the larger cell to be filled.

In an embodiment a plurality of cells 4 at a time can be singularized and gripped by transfer unit 25, which then comprises a number of gripping means 60. The gripping means can then be moved relative to each other, in particular moved apart, so that the respective gripping means can be aligned in each case with cavities 34 of cells 32.

FIGS. 8A-8D show embodiments of steps of the transfer method. The gripped singularized cell 4 is shown in side view. The larger cell 32 shown in cross-section is filled with substrate 33 and provided with a cavity 34. Cavity 34 can for instance be formed by removing substrate. The shape of the cavity corresponds to the volume of cell 4.

Figure 8A:
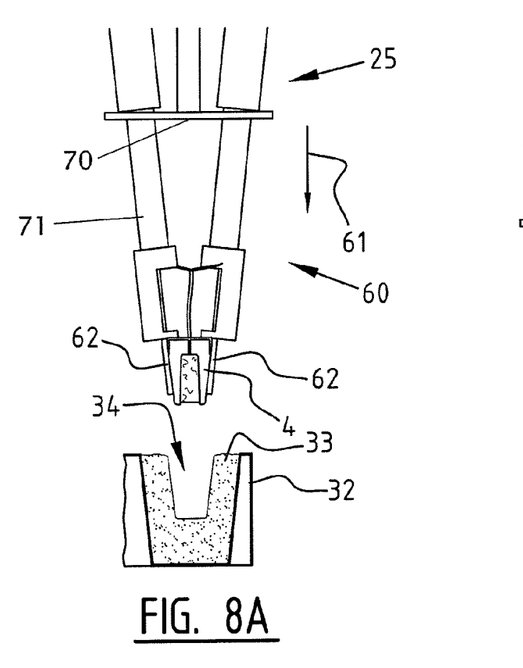
FIGS. 8A-8D are cross-sectional side views of steps of a first embodiment of the method for transferring plant material.
Figure 8B:
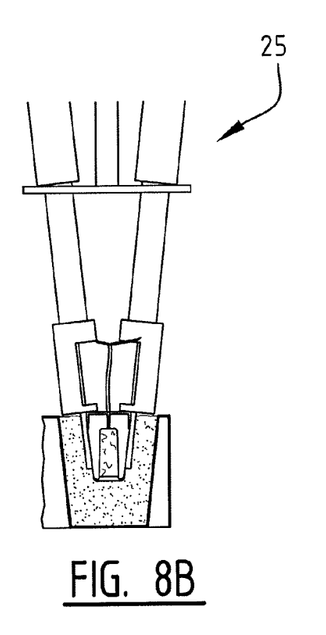

According to the invention transfer unit 25 is moved along frame 26 and vertically aligned with larger cell 32. Gripping means 60 then move as according to arrow 61 and place the singularized cell 4 into cavity 34 as shown in FIG. 8B. More particularly, in the embodiment shown, gripping means or mechanism 60 comprises a frame 70 and dual arms 71. As described additionally below, arms 71 are movable up or down in a longitudinal direction (down indicated by arrow 61) relative to frame 26. In some embodiments, entire gripping means or mechanism 61 (e.g., including housing 28) move relative to frame 26; arms 71 move longitudinally relative to frame 70 and housing 28; or frame 70 and arms 71 move longitudinally relative to housing 28. In the embodiment shown, each arm 71 comprises a clamp 64 at the distal or outer end of the arm 71.

Figure 8C:
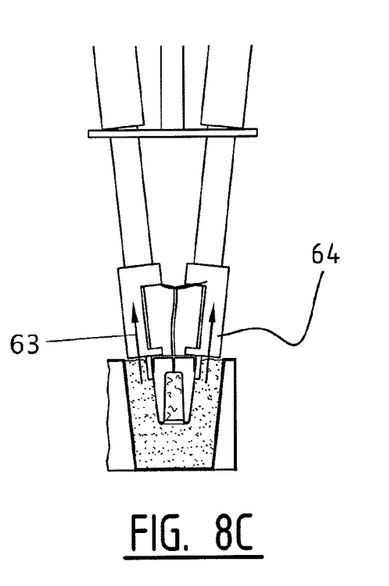

The gripping means comprise a number of pins 62 for gripping parts of wall 10 of cell 4. Transfer means 25 is configured to actuate pins 62 longitudinally relative to the outer end of the respective arm 71 (and clamp 64). These pins 62 can, as shown in FIG. 8C, be retracted as according to arrow 63 using drives, not shown in detail, suitable for this purpose. The pins are situated at the outer end of clamps 64 which, as shown in FIG. 8A-8C, partially enclose the plant material protruding from cell 4.

Figure 8D:
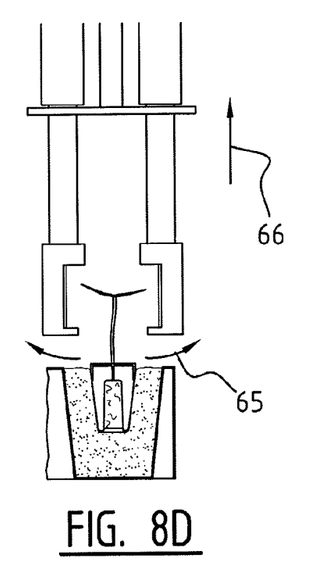

Once pins 62 have been retracted, arms 71 and clamps 64 can be pivoted apart as according to arrow 65 (such that the distance increases between clamps 64, while the distance remains substantially constant between arms 71 at frame 70). As a result the clamps can then be retracted as according to arrow 66 at a safe distance from plant material 6 and without causing damage thereto.

It will be understood that the above description by way of example only and that modifications may be made by those skilled in the art. The above examples provide a complete description of the structure and use of exemplary embodiments. After examination of the foregoing many additional and alternative embodiments will occur to the skilled person, all of which lie within the scope of protection of the present invention as according to the appended claims, unless such additional or alternative embodiments depart from the letter or spirit of the definitions in these claims.

The claims are not intended to include, and should not be interpreted to include, means-plus- or step-plus-function limitations, unless such a limitation is explicitly recited in a given claim using the phrase(s) "means for" or "step for," respectively.

It will be understood that the benefits and advantages described above may relate to one embodiment or may relate to several embodiments. It will further be understood that reference to 'an' item refers to one or more of those items, unless otherwise specified.

The steps of the methods described herein may be carried out in any suitable order, or simultaneously where appropriate.

Where appropriate, aspects of any of the examples described above may be combined with aspects of any of the other examples described to form further examples having comparable or different properties and addressing the same or different problems.

The invention claimed is:

1. Method for automatically transferring plant material, comprising of providing plant material in a number of cells in a container having only a single row of cells, wherein each cell of the number of cells defines a plant position and has at least a wall, wherein at least the wall is formed from biodegradable material, and transferring the cell with the wall to a larger cell which defines a plant position and which is formed by at least one wall, and, prior to transferring, automatically gripping a single cell with plant material and an adjacent cell from a lateral direction with a horizontal arm before breaking a connection between the single cell and the adjacent cell, wherein the transferring comprises automatically gripping said single cell with a horizontally and vertically displaceable transfer unit, displacing the single cell with plant material in a horizontal direction substantially perpendicular to the single row of cells, placing the single cell with plant material in the larger cell and releasing the single cell with plant material.

2. Method as claimed in claim 1, wherein the larger cell is filled with substrate prior to the transfer.

3. Method as claimed in claim 1, wherein the container has a row of more than eight cells lying substantially in a line.

4. Method as claimed in claim 1, wherein at least one side of each cell has an opening in the wall having an area greater than 20% of the area of the side.

5. Method as claimed in claim 1, wherein the breaking comprises of non-machining breaking of the connection by means of a laser.

6. Method as claimed in claim 1, wherein the transfer comprises of gripping a wall of the single cell.

7. Method as claimed in claim 1, wherein the larger cell is provided by supplying a tray comprising a number of larger cells.

8. Method as claimed in claim 1, further comprising moving the horizontal arm and the single row of cells away from the single cell after breaking the connection between the single cell and the adjacent cell and before displacing the single cell with plant material in a horizontal direction substantially perpendicular to the single row of cells.

9. Method as claimed in claim 8 further comprising moving the horizontal arm and the single row of cells away from the single cell after breaking the connection between the single cell and the adjacent cell and before displacing the single cell with plant material in a horizontal direction substantially perpendicular to the single row of cells.

10. Method as claimed in claim 9 further comprising displacing the single cell in a vertical direction after moving the adjacent cell away from the single cell and before displacing the single cell with plant material in a horizontal direction substantially perpendicular to the single row of cells.

* * * * *